United States Patent
Menke

(10) Patent No.: US 8,222,760 B2
(45) Date of Patent: Jul. 17, 2012

(54) METHOD FOR CONTROLLING A PROXIMITY SENSOR OF A WIND TURBINE

(75) Inventor: Detlef Menke, Lotte (DE)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 12/826,031

(22) Filed: Jun. 29, 2010

(65) Prior Publication Data

US 2011/0140422 A1 Jun. 16, 2011

(51) Int. Cl.
*F03D 9/00* (2006.01)
*H02P 9/04* (2006.01)
*B63H 1/00* (2006.01)
*B64C 11/00* (2006.01)
*F01D 5/00* (2006.01)

(52) U.S. Cl. ................. 290/44; 290/55; 416/61; 73/650
(58) Field of Classification Search .................... 290/44, 290/55; 416/61; 73/650
See application file for complete search history.

(56) References Cited

U.S. PATENT DOCUMENTS

| | | | | |
|---|---|---|---|---|
| 3,307,164 A | * | 2/1967 | Zimmer | 340/870.24 |
| 3,613,000 A | * | 10/1971 | Weir et al. | 324/174 |
| 3,808,560 A | * | 4/1974 | Gassmann | 332/170 |
| 3,885,420 A | * | 5/1975 | Wolfinger | 73/650 |
| 4,148,222 A | * | 4/1979 | Wolfinger | 73/650 |
| 4,257,040 A | * | 3/1981 | Shirasaki et al. | 340/671 |
| 4,317,371 A | * | 3/1982 | Wolfinger | 73/650 |
| 4,322,976 A | * | 4/1982 | Sisson et al. | 73/659 |
| 4,347,571 A | * | 8/1982 | Leung et al. | 701/111 |

(Continued)

FOREIGN PATENT DOCUMENTS

EP 1 674 724 A2 6/2006

(Continued)

OTHER PUBLICATIONS

Search Report from corresponding EP Application No. 11171158.6 dated Oct. 17, 2011.

*Primary Examiner* — Pedro J Cuevas
(74) *Attorney, Agent, or Firm* — Global Patent Operation; Douglas D. Zhang

(57) ABSTRACT

The present disclosure relates to a method for controlling at least one proximity sensor of a wind turbine, the wind turbine comprising a rotor shaft, the at least one proximity sensor being adapted to measure a radial displacement of the rotor shaft; the method includes: providing at least one reference value, detecting an output of the at least one proximity sensor, the output depending on a measured distance by the respective proximity sensor; comparing the detected output of the proximity sensor with at least one reference value. Further, the present relates to a control arrangement for a wind turbine, the wind turbine comprising a wind rotor shaft; wherein the control arrangement comprises at least one proximity sensor being adapted to measure a radial displacement of the rotor shaft, wherein the at least one proximity sensor is adapted to generate an output signal depending on a measured distance by the respective proximity sensor; wherein the control arrangement further comprises a control device, the control device being adapted to receive the output signal of the at least one proximity sensor, wherein the control device is adapted to compare the output signal with at least one reference value. Finally, the present disclosure relates to a wind turbine comprising a control arrangement.

18 Claims, 6 Drawing Sheets

U.S. PATENT DOCUMENTS

| | | | | |
|---|---|---|---|---|
| 4,390,327 | A * | 6/1983 | Picavet | 418/35 |
| 4,437,163 | A * | 3/1984 | Kurihara et al. | 702/56 |
| 4,551,715 | A * | 11/1985 | Durbin | 340/671 |
| 4,614,117 | A * | 9/1986 | Taniguti | 73/659 |
| 4,700,094 | A * | 10/1987 | Downer et al. | 310/90.5 |
| 4,700,117 | A * | 10/1987 | Giebeler et al. | 388/814 |
| 4,723,735 | A * | 2/1988 | Eisenhaure et al. | 244/165 |
| 4,764,767 | A * | 8/1988 | Ichikawa et al. | 340/870.31 |
| 4,782,452 | A * | 11/1988 | Thomas | 340/680 |
| 4,833,405 | A * | 5/1989 | Richards et al. | 324/207.22 |
| 4,862,749 | A * | 9/1989 | Yagi | 73/650 |
| 5,144,840 | A * | 9/1992 | Whipple, III | 73/660 |
| 5,156,822 | A * | 10/1992 | Whipple, III | 117/201 |
| 5,198,763 | A * | 3/1993 | Konishi | 324/207.23 |
| 5,221,250 | A * | 6/1993 | Cheng | 494/7 |
| 5,253,531 | A * | 10/1993 | Walker et al. | 73/650 |
| 5,382,218 | A * | 1/1995 | Uchida | 494/10 |
| 5,390,545 | A * | 2/1995 | Doan | 73/650 |
| 5,438,882 | A * | 8/1995 | Karim-Panahi et al. | 73/862.324 |
| 5,448,924 | A * | 9/1995 | Nagai et al. | 73/865.9 |
| 5,469,055 | A * | 11/1995 | Mueller et al. | 324/207.21 |
| 5,474,813 | A * | 12/1995 | Walker et al. | 427/510 |
| 5,696,444 | A * | 12/1997 | Kipp et al. | 324/207.23 |
| 5,734,108 | A * | 3/1998 | Walker et al. | 73/650 |
| 6,107,794 | A * | 8/2000 | Kipp et al. | 324/207.23 |
| 6,253,620 | B1 * | 7/2001 | Yamashita | 73/650 |
| 6,396,259 | B1 | 5/2002 | Washeleski et al. | 324/207.22 |
| 6,589,151 | B2 * | 7/2003 | Akatsu et al. | 494/7 |
| 6,795,779 | B2 * | 9/2004 | Delvaux et al. | 702/41 |
| 6,844,541 | B2 * | 1/2005 | Alsobrooks et al. | 250/231.13 |
| 6,956,198 | B2 * | 10/2005 | Alsobrooks et al. | 250/231.13 |
| 7,004,724 | B2 * | 2/2006 | Pierce et al. | 416/61 |
| 7,102,379 | B2 * | 9/2006 | Hobelsberger et al. | 324/765.01 |
| 7,117,744 | B2 * | 10/2006 | Hobelsberger et al. | 73/660 |
| 7,160,083 | B2 * | 1/2007 | Pierce et al. | 416/61 |
| 7,322,794 | B2 | 1/2008 | LeMieux et al. | 416/40 |
| 7,352,075 | B2 * | 4/2008 | Willey et al. | 290/44 |
| 7,380,433 | B2 * | 6/2008 | Seethaler et al. | 73/1.79 |
| 7,437,264 | B2 * | 10/2008 | Pierce et al. | 702/151 |
| 7,528,356 | B2 * | 5/2009 | Martinez | 250/231.13 |
| 7,583,200 | B2 * | 9/2009 | Gerez | 340/679 |
| 7,763,989 | B2 * | 7/2010 | Kinzie et al. | 290/44 |
| 7,791,232 | B2 * | 9/2010 | Purohit et al. | 310/68 B |
| 7,822,560 | B2 * | 10/2010 | LeMieux | 702/34 |
| 7,874,797 | B2 * | 1/2011 | Pierce et al. | 416/1 |
| 8,029,233 | B2 * | 10/2011 | Hoffmann et al. | 415/118 |
| 8,106,649 | B2 * | 1/2012 | Kaita et al. | 324/207.25 |
| 2004/0151577 | A1 * | 8/2004 | Pierce et al. | 415/4.1 |
| 2007/0205602 | A1 * | 9/2007 | Willey et al. | 290/44 |
| 2007/0208487 | A1 * | 9/2007 | Seethaler et al. | 701/101 |
| 2007/0294049 | A1 * | 12/2007 | Pierce et al. | 702/151 |
| 2008/0112807 | A1 * | 5/2008 | Uphues et al. | 416/1 |
| 2009/0035136 | A1 * | 2/2009 | Pierce et al. | 416/144 |
| 2009/0169357 | A1 * | 7/2009 | Slack | 415/26 |
| 2009/0246021 | A1 * | 10/2009 | Fric et al. | 416/43 |
| 2009/0261588 | A1 | 10/2009 | Von Mutius et al. | 290/44 |
| 2009/0263246 | A1 | 10/2009 | Bolz | 416/61 |
| 2009/0266160 | A1 * | 10/2009 | Jeffrey et al. | 73/455 |
| 2009/0275273 | A1 * | 11/2009 | Purohit et al. | 451/357 |
| 2009/0295244 | A1 * | 12/2009 | Ries | 310/90.5 |
| 2009/0306829 | A1 * | 12/2009 | Hildebrand et al. | 700/279 |
| 2010/0007340 | A1 * | 1/2010 | Kaita et al. | 324/207.25 |
| 2010/0054941 | A1 * | 3/2010 | Hoffmann | 416/61 |
| 2010/0133817 | A1 * | 6/2010 | Kinzie et al. | 290/44 |
| 2010/0133818 | A1 * | 6/2010 | Kinzie et al. | 290/44 |
| 2010/0133819 | A1 * | 6/2010 | Kinzie et al. | 290/44 |
| 2010/0143119 | A1 * | 6/2010 | Kooijman et al. | 416/1 |
| 2010/0300641 | A1 * | 12/2010 | Purohit et al. | 164/111 |
| 2010/0308673 | A1 * | 12/2010 | Purohit et al. | 310/50 |
| 2010/0312504 | A1 * | 12/2010 | Rossi et al. | 702/56 |
| 2011/0006527 | A1 * | 1/2011 | Kinzie et al. | 290/44 |
| 2011/0142622 | A1 * | 6/2011 | Hoffmann et al. | 416/1 |

FOREIGN PATENT DOCUMENTS

| | | |
|---|---|---|
| EP | 1 760 311 A2 | 3/2007 |
| EP | 2 060 785 A1 | 5/2009 |
| WO | 99/57435 A1 | 11/1999 |

* cited by examiner

METHOD FOR CONTROLLING A PROXIMITY SENSOR OF A WIND TURBINE

BACKGROUND OF THE INVENTION

The present disclosure relates to a method for controlling at least one proximity sensor of a wind turbine, the wind turbine including a rotor shaft. Further, the present disclosure relates to a control arrangement. More particularly, the present disclosure relates to a control arrangement for a wind turbine, the wind turbine including a wind rotor shaft. Additionally, the present disclosure relates to a wind turbine. More particularly to a wind turbine including a control device, wherein the control arrangement includes at least one proximity sensor being adapted to measure a radial displacement of the rotor shaft.

Wind rotor blades are connected to a hub which is connected to a wind rotor shaft. Typically, the wind rotor shaft is bended in dependence of the wind in a radial direction of the wind rotor shaft. In some wind turbines an asymmetric load control is provided, for controlling and reducing the loads on the wind turbine. For that reason, wind turbines manufactures have installed proximity sensors, to measure the distance to a flange of the wind rotor shaft, such that from a change of the distance, an asymmetric load of the wind turbine rotor may be reduced. Typically, the proximity sensors may have a special working distance, for example 2 to 10 mm. For example, the proximity sensor location is adjusted while mounting, to be in the limits considering also the turbine operation. Typically, a control of the correct operation of the proximity sensors, for example the relation of distance to output and/or the fixing, is not possible. For example, in case of a laminar flow of wind, the wind turbine rotor is bent constantly in one radial direction of the wind rotor shaft. Thus, the measured distances of the proximity sensors do not change. Thus, the output of the proximity sensors do not change, such that a controller may conclude, that the proximity sensor out of order or do not work properly. A defect sensor for an asymmetric load control may cause a curtailed operation (70% of the rated power) or downtimes.

BRIEF DESCRIPTION OF THE INVENTION

In view of the above, a method for controlling at least one proximity sensor of a wind turbine is provided. The wind turbine including a rotor shaft, the at least one proximity sensor being adapted to measure a radial displacement of the rotor shaft. The method includes: providing at least one reference value, detecting an output of the at least one proximity sensor, the output depending on a measured distance by the respective proximity sensor; comparing the detected output of the proximity sensor with at least one reference value.

According to a further embodiment, a control arrangement for a wind turbine is provided, the wind turbine including a wind rotor shaft. The control arrangement includes at least one proximity sensor being adapted to measure a radial displacement of the rotor shaft, wherein the at least one proximity sensor is adapted to generate an output signal depending on a measured distance by the respective proximity sensor; wherein the control arrangement further includes a control device, the control device being adapted to receive the output signal of the at least one proximity sensor, wherein the control device is adapted to compare the output signal with at least one reference value.

According to a further aspect, a wind turbine including a control arrangement is provided. The control arrangement includes at least one proximity sensor being adapted to measure a radial displacement of the rotor shaft, wherein the at least one proximity sensor is adapted to generate an output signal depending on a measured distance by the respective proximity sensor; wherein the control arrangement further includes a control device, the control device being adapted to receive the output signal of the at least one proximity sensor, wherein the control device is adapted to compare the output signal with at least one reference value.

Further aspects, advantages and features of the present invention are apparent from the dependent claims, the description and the accompanying drawings.

BRIEF DESCRIPTION OF THE DRAWINGS

A full and enabling disclosure including the best mode thereof, to one of ordinary skill in the art, is set forth more particularly in the remainder of the specification, including reference to the accompanying figures wherein.

DETAILED DESCRIPTION OF THE INVENTION

Reference will now be made in detail to the various embodiments, one or more examples of which are illustrated in each figure. Each example is provided by way of explanation and is not meant as a limitation. For example, features illustrated or described as part of one embodiment can be used on or in conjunction with other embodiments to yield yet further embodiments. It is intended that the present disclosure includes such modifications and variations.

Figure 1:
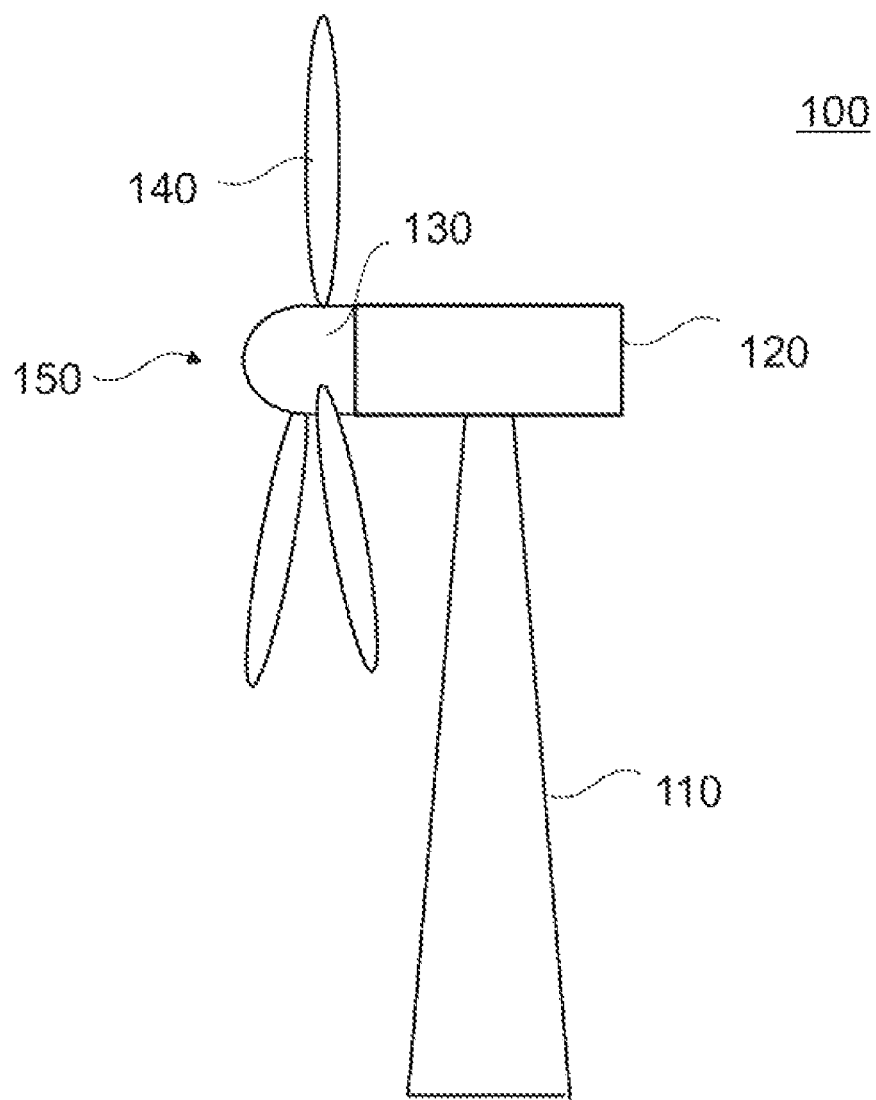
FIG. 1 shows an embodiment of a wind turbine.

FIG. 1 shows a wind turbine 100. The wind turbine 100 includes a tower 110 on which a nacelle 120 is mounted. The nacelle 120 is rotatable about a vertical axis of the tower. Within the nacelle 120, a generator for transforming rotational energy into electrical energy is placed. The generator is connected to a hub 130 that is rotatable about a horizontal axis. Three rotor blades 140 are connected to the hub 130. The rotor blades 140 and the hub 130 together form a wind rotor 150 of the wind turbine 100. The wind turbine 100 operates as follows. In a typical situation, the nacelle 120 is rotated about the vertical axis such that the horizontal axis of the hub 130 is approximately parallel to a wind direction. The wind exerts a torque on the wind rotor due to an aerodynamical profile of the rotor blades 140. Accordingly, the wind rotor rotates about its horizontal axis, thus driving the generator. The generator transforms the mechanical rotation into an electric current. Hence, the kinetic energy of the wind is transformed into electric energy.

Figure 2:
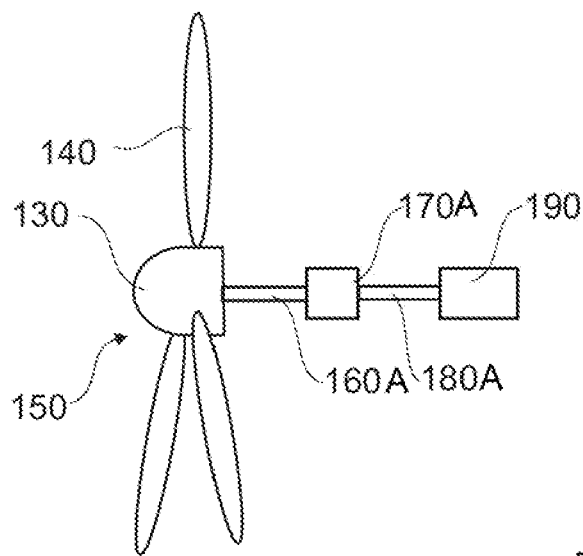
FIG. 2 shows schematically an embodiment of a drive train of a wind turbine.

FIG. 2 shows an embodiment of a drive train of a wind turbine. The wind rotor 150 is connected by a wind rotor shaft 160A to a gear box 170A. The wind rotor shaft 160A is, in a typical embodiment, also called low speed shaft. In the gear box 170A a first rotational speed of the wind rotor shaft 160A is converted into a second rotational speed which is transmitted via a generator shaft 180A to a rotor of a generator 190. The generator 190 transforms the rotational power of the generator shaft 180A to electrical power that may be fed into a grid. In another embodiment, which may be combined with other embodiments disclosed herein, the wind rotor shaft 160A may be directly connected to the rotor of the generator 190. Thus, the wind turbine may be realized without a gear box.

Figure 3:
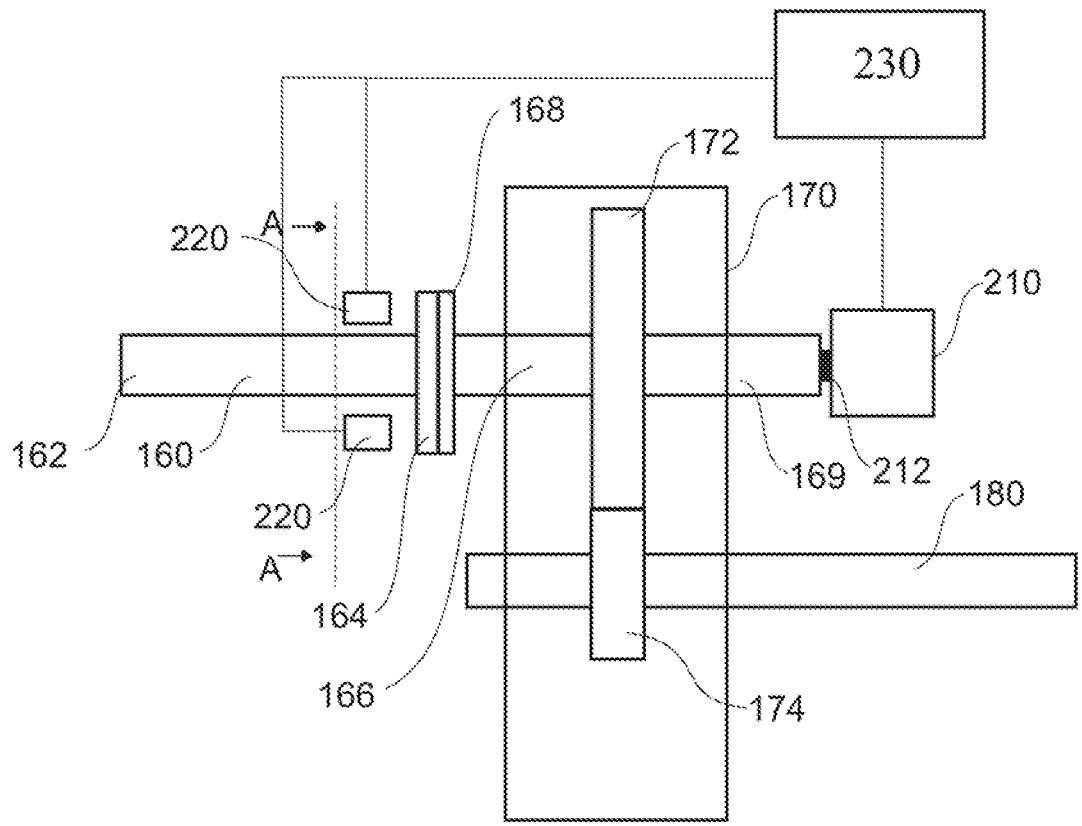
FIG. 3 shows schematically an embodiment of a gear box and a part of a wind rotor shaft.

Typically, as shown in FIG. 3, the wind rotor shaft 160 includes a wind rotor portion 162 between the wind rotor and a flange 164 and a gear box portion 166 which includes a flange 168 which is connected to the flange 164 of the wind rotor portion 162. The flange of the gear box portion 168 and the flange 164 of the wind rotor portion 162 of the wind rotor shaft 160 are fixed to each other with bolts. In another embodiment, the wind rotor portion 162 may be directly connected to a generator rotor shaft 180. Typically, the generator rotor shaft 180 may include a generator flange fixed to the wind rotor portion 162.

FIG. 3 shows a schematical drawing of an embodiment of a gear box. The gear box may include a big driving gear 172 disposed on and rotating with the wind rotor shaft 160, in particular with the gear box portion 166, and a small driven gear 174 that drives the generator shaft 180. The driving gear 172 and the driven gear 174 engage each other. Further, a stump 169 of the gear box portion 166 extends out of the gear box 170 in the opposite direction to the wind rotor 150. Further, in an embodiment, which may be combined with other embodiments disclosed herein, a rotary encoder 210 is coupled to the stump 169 of the wind rotor shaft 160. In a typical embodiment, the rotary encoder is connected to the wind rotor shaft 160 by a coupling 212. The rotary encoder converts, in a typical embodiment, an angular position of the wind rotor shaft 160 to an analog or digital code. Thus, the rotary encoder may act as an angle transducer. In a further embodiment, the rotary encoder may be placed at another position of the wind rotor shaft. In a further embodiment, the rotary encoder may be connected to the wind rotor shaft 170 via a gear.

In a typical embodiment, one or more proximity sensors 220 is or are disposed to measure a distance to the flange 164 of the wind rotor portion of the wind rotor shaft 160. In other embodiments, the one or more proximity sensors 220 is or are disposed to measure their distance to the flange 168 of the gear box portion 166. The rotary encoder 210 and the proximity sensors 220 are in a typical embodiment connected to a controller 230. In a further embodiment, which may be combined with other embodiments disclosed herein, one or more proximity sensors may rotate with the wind rotor shaft 160 and a distance measurement disc or ring may be disposed stationary close to the proximity sensors such that they measure the distance to the measurement disc or ring. In a typical embodiment, the proximity sensors are used to measure the bending of the wind rotor shaft, and a controller may deduct from the measured distance values the load on the wind rotor shaft in a radial direction. Thus, an asymmetric load on the wind rotor shaft may be measured and/or controlled. Typically, depending on the measured or deduced asymmetric load, the wind turbine generator adjusts its parameters, for example a blade pitch, to reduce the loads on components of the wind turbine, for example to reduce the loads on the blades, on the wind rotor shaft, and/or the tower. Typically with four proximity sensors, the load in x and y direction, i.e. in the rotation plane or a radial plane of the wind rotor shaft, may be measured.

In a typical embodiment, the proximity sensors have a spatial working distance of about 2 to 10 mm. In an embodiment, it may be necessary to adjust the proximity sensor location while mounting, such that the proximity sensors are disposed within their working distance range. Typically, the proximity sensors are a linear transducer. For example, the output signal of the proximity sensor may change linearly depending on their distance to the object to be measured, for example the flange of a wind rotor shaft. In a typical embodiment, the output signal may change linearly in the working range of the proximity sensors, for example 1 to 10 mm. For example the output signal may be current signal, a voltage signal and/or a digital signal. Typically, the proximity sensors are contact free sensors. For example, in an embodiment, the proximity sensors may be an inductive sensor. In another embodiment, which may be combined with other embodiments disclosed herein, the proximity sensor may be a capacitive sensor.

Figure 4:
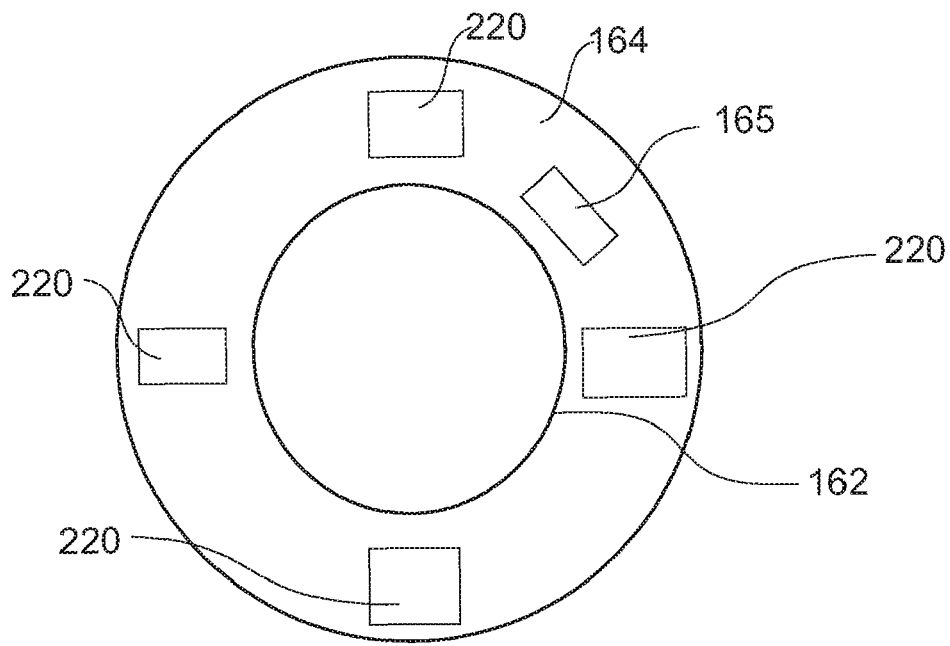
FIG. 4 shows schematically a cross section in radial direction of a wind rotor shaft.

FIG. 4 shows a cross sectional view of the wind rotor shaft of section A-A of FIG. 3. In a typical embodiment four proximity sensors 220 are disposed in a regular angular distance around the shaft, such that each may measure the distance to the flange 164 of the wind rotor portion 162. Further, a detection mark 165 is disposed on the flange 164. In another embodiment, two or more detection marks 165 may be disposed on the flange 164. The detection mark(s) 165 may form a pattern on the flange. In a further embodiment, which may be combined with other embodiments disclosed herein, during machining or production of the flange a pattern is generated on the flange. In an embodiment, the pattern may be formed like the detection marks in some embodiments disclosed herein.

Figure 5:
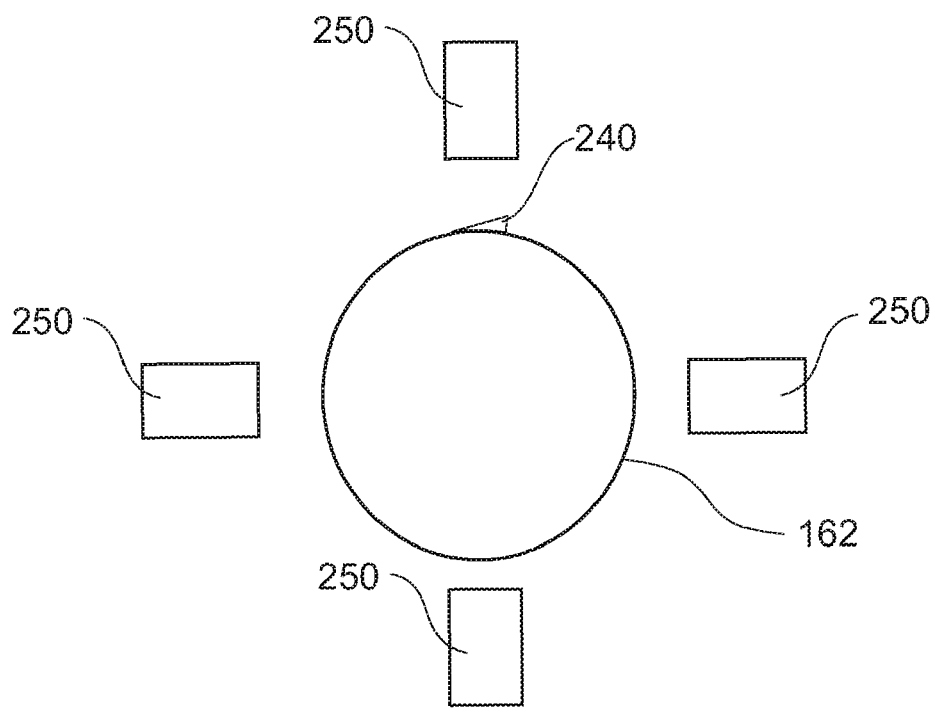
FIG. 5 shoes schematically a cross section in radial direction of another embodiment of a wind rotor shaft.

FIG. 5 show a cross section of the wind rotor shaft 160 of a further embodiment. Typically, one or more detection marks 240 are disposed on wind rotor shaft 160, typically at regular intervals around the circumference. A proximity sensor 250 is disposed to detect the passing by of a detection mark 240 and to generate an output value depending on the distance of the closest measurable object.

Typically in another embodiment, a pattern may be provided in the shaft or in the shaft during production of the same, e.g. at a radial distance or an axial position where the proximity sensors are disposed. For example, production inaccuracies of the shaft or the flange may create a pattern. In an embodiment, which may be combined with other embodiments disclosed herein, the detection marks and/or the pattern on the flange or the shaft cover a substantial portion of the relevant distance range or height range to be measured for the purpose of the control of the wind turbine. For example, if only the distance between 2 and 10 mm are relevant for determining the load in a radial direction of the wind rotor shaft, a substantial portion of these distance range are covered by the pattern of by the detection mark. In other embodiments, the complete range to be measured for the purpose of control of the wind turbine is covered by the pattern or the detection mark. In another embodiment, a predetermined distance difference may be used for the verification of the functioning of the proximity sensor.

In a typical embodiment, the detection mark 165, 240 may be a metal stripe, at the main shaft flange or on the shaft itself on a position, where the sensors measure the distance. For example, the material of the pattern and/or the detection mark depends on the proximity sensor used. In a typical embodiment, which may be combined with other embodiments disclosed herein, the metal stripe may have a specific, predetermined thickness. For example thickness the may be about 2 mm. In another embodiment, the thickness is may be between 1 mm and 3 mm. Thus, the distance difference is between 1 mm and 3 mm to be measured by the proximity sensor.

In an embodiment, where the detection mark 165, 240 passes the proximity sensors, the proximity sensors 220, 250 measure now the distance between the proximity sensor and the detection mark. In a typical embodiment, the detection mark and/or a pattern may cover an angular range between 0.5° and 5°, typically about 1° or less. Thus, for example the proximity sensors measure now the distance to the flange and for a short area to the metal stripe, if such a detection mark is used. In an embodiment, the angular position, angular extension, and/or height profile of the pattern and/or the detection mark may be known by the controller.

For example, if a metallic detection mark is used, like the metal stripe, the sensor will generate a peak at the output. Typically, as the sensors may be linear sensors, the peak must have a specific value, for example for 2 mm the output may be about 4 mA. In an embodiment, this value may give a meaningful information about the correct operation of the proximity sensors and may be monitored by a software.

In another embodiment, a weld may be used as a detection mark. For example, in an embodiment, a proximity sensor or all proximity sensors may measure the weld. The measured signals may be stored within a software and may be used as a reference signal to check the functionality of the proximity sensors.

In an embodiment, the profile of the flange at a radial distance, where the proximity sensors measures the distance to the flange, may be used as a the pattern for controlling the function of the proximity sensors. Then, during operation of the wind turbine, the measured values are compared to the reference values of the pattern, and if a measured height changes does not correspond to the height reference values, the control device may conclude, that the proximity sensor does not function properly. For example, if the pattern or the detection mark has a height difference 2 mm between two points having a specific angular distance and/or a specific angular value and this value is stored in the controller, and during operation the proximity sensor generates a signal corresponding at that specific angular distance and/or specific angular value of about 4 mm, the control device may conclude, that the proximity sensor does not function probably. Typically, the height differences are biased by the normal value caused by the load acting on the main shaft. In an embodiment, which may be combined with other embodiments disclosed herein, the angular position and the form of the pattern, for example the detection mark, is stored within the control device as a reference pattern.

In another embodiment, it is possible to measure, if the sensor is out of the limit, for example if the distance to the flange or the shaft is greater 10 mm including the detection mark or the pattern. Typically, in such a case a warning may be generated such that a service team may repair the sensor.

In another embodiment, which may be combined with other embodiments disclosed herein, the sensor conversion of amplification may be monitored. For example, if several discrete or continuous heights of the reference pattern or the detection mark are provided, which may be measured by the proximity sensor, the values may be compared with reference values stored within the control device.

In another embodiment, the signals generated by the pattern or detection marks may be used for a speed measurement system, for determining the rotational speed of the wind rotor shaft. For example, the time between the generated peaks, for example caused by the detection mark, may be measured and be used as a speed reference.

Figure 6:
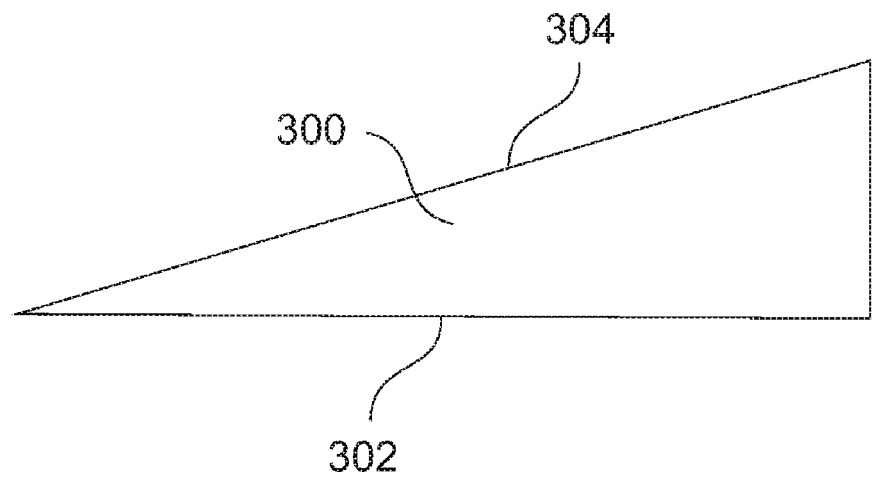
FIG. 6 shows a schematical drawing of an embodiment of a detection mark.

FIG. 6 shows an embodiment of a detection mark 300. The detection mark is in a typical embodiment metallic. For example, the detection mark 300 may be a weld or in another wise integrated into the flange or the wind rotor shaft. In another embodiment, the detection mark 300 may be bonded to a flange or the wind rotor shaft of a wind turbine. The detection mark has a detection mark base 302 where it may be connected to the flange or the wind rotor shaft and a detection surface 304. The detection surface 304 is in an embodiment a continuous ramp, such that the amplification of the proximity sensors may be controlled. In an embodiment, the height of the ramp may be selected, such that they represent a substantial range of the values to be measured in operation of the wind turbine. Typically, the detection surface of the detection marks provides a profile of height difference values that is stored in the controller with the angular position and/or the angular extension of the detection mark, such that during operation the profile may be compared with measured values.

Figure 7:
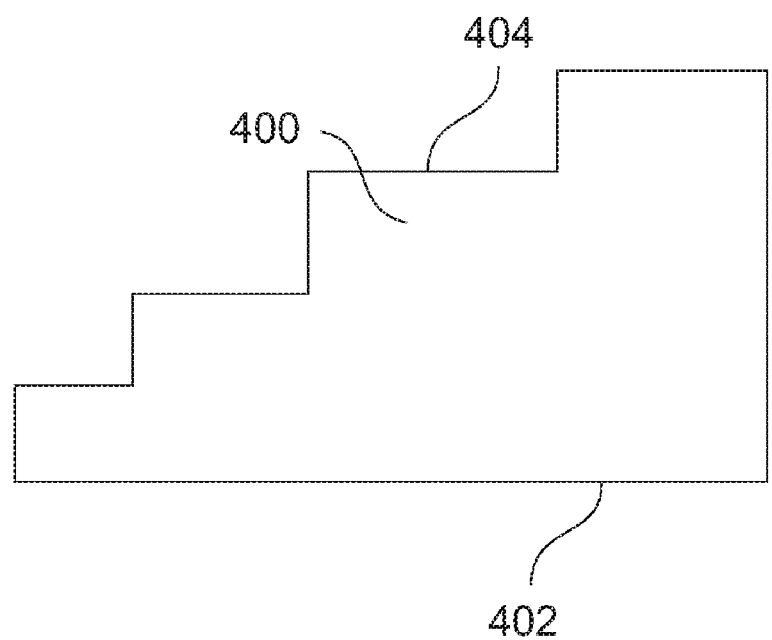
FIG. 7 shows a schematical drawing of a further embodiment of a detection mark.

FIG. 7 shows another embodiment of a detection mark 400 having a detection mark base 402 which is connected to the flange on the wind rotor shaft. Further, opposite to the base, the detection mark includes a detection surface 404. The detection surface 404 represents a ramp with a plurality of discrete height values. For example, the ramp may present 2, 3, 4, 5, 6 or more height values. With such a detection mark, the operation, in particular the amplification, of the proximity sensors may be controlled. Typically, with the plurality of height values, the linearity of the proximity sensor may be checked.

Figure 8:
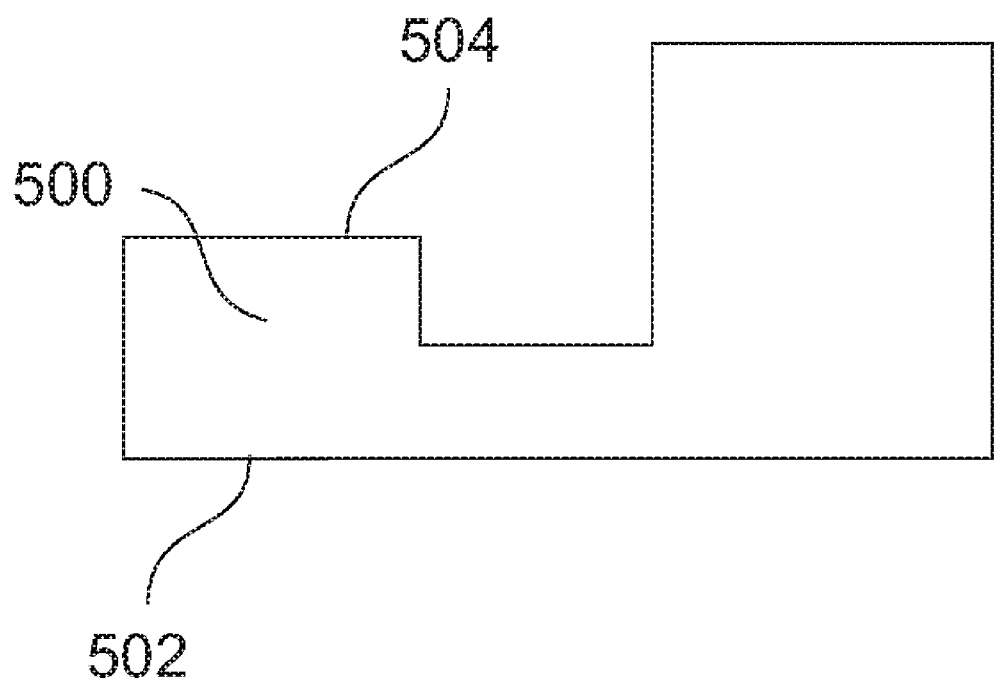
FIG. 8 shows a schematical drawing of a further embodiment of a detection mark.

FIG. 8 shows another embodiment of a detection mark 500 having a detection mark base 502 and a detection surface 504 opposite to the detection mark base in radial direction. The detection mark base is fixed to the flange or to the wind rotor shaft of the wind turbine. The detection mark of FIG. 8 includes three discrete height values, which are not in a ramp configuration.

Figure 9:
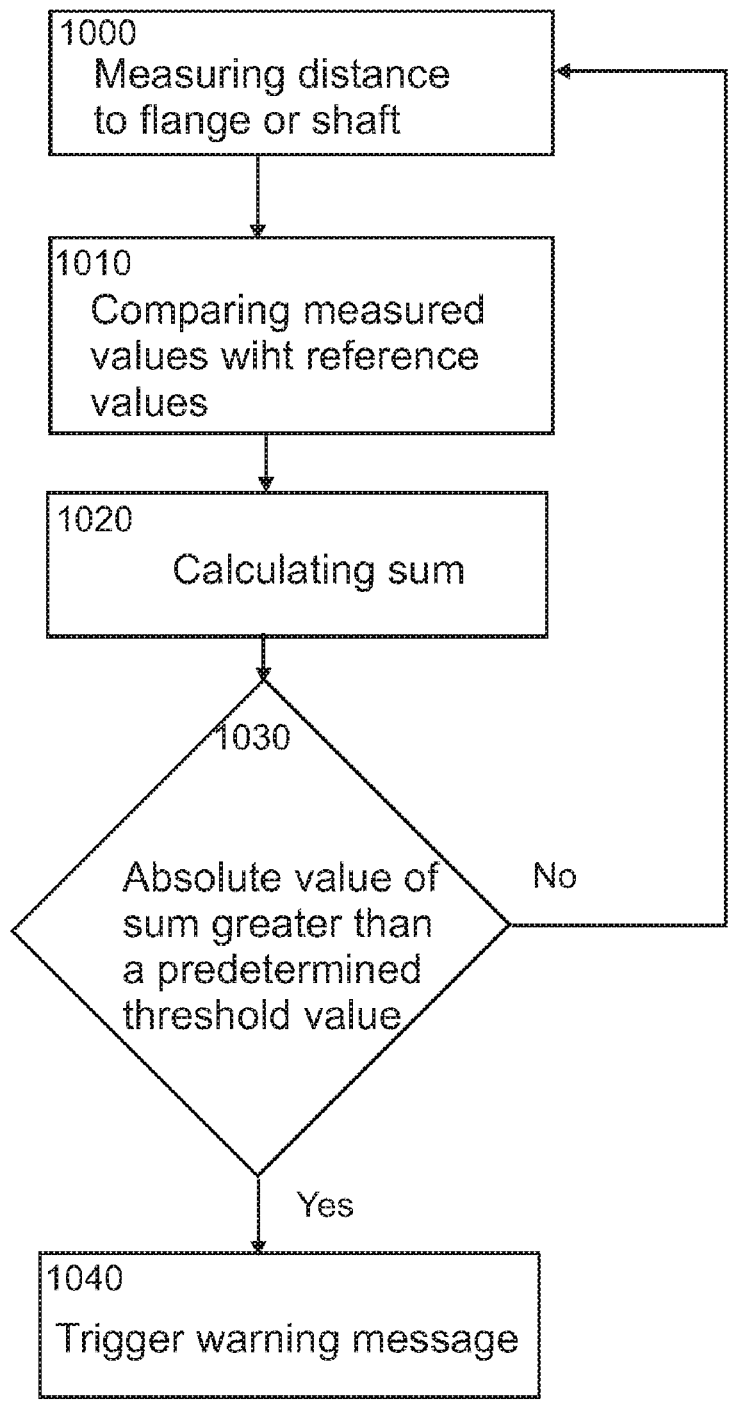
FIG. 9 shows a flow chart of a method for operating a wind turbine.

FIG. 9 shows a flow chart of a method for operating a wind turbine, in particular a control device for proximity sensors for detecting the radial load on a wind rotor shaft. In block 1000, the distance of at least one proximity sensor to a rotor shaft, in particular the wind rotor shaft, or a flange of the rotor shaft is measured by the at least one proximity sensor. In block 1010, the measured values are compared with reference values stored in the control device. For example, the reference values may be or depend on the pattern and/or a profile of the rotor shaft or the flange of the rotor shaft at a position measured by the proximity sensors, in particular at a specific angular position and/or for an angular extension. In a typical embodiment, the profile may include the profile of a detection mark. Typically, the reference values depend on the characteristics of the pattern. For example, in an embodiment, the actual load value or the bending of the wind rotor shaft may be taken into account for the comparison between the measured values and the reference values, e.g. as a biasing value. In another embodiment, a step height of measured values is compared with a reference value. In a typical embodiment, the at least one reference values include characteristics of the at least one pattern, for example the height differences, the step heights and/or the absolute heights.

In an embodiment, in box 1020, the difference values of the measured values and the reference values may be combined, for example by a sum, in particular further including the offset. In another embodiment, the difference or the discrepancy between the measured values and the reference values are determined otherwise. In a typical embodiment, for example in box 1030, the combined differences of is compared to a predetermined threshold, and in case the offset exceed a predetermined threshold value the control device may trigger an alarm or a warning message, that a proximity sensor may not function properly (box 1040).

In a further embodiment, the control device which is used to determine the load on the wind rotor or the wind rotor shaft may filter the values of the detection marks or the profile used for determining the functioning of the proximity sensors, such that they are not taken into account for the respective calculation of the load.

Typically, in an embodiment, which may be combined with other embodiments disclosed herein, the method to monitor the sensors while the turbine is in operation is shown, For example it may check if the sensors are working correctly or if they need a mechanical adjustment.

In a typical embodiment, which may be combined with other embodiments disclosed herein, the at least one pattern is provided such that the at least one pattern is adapted to be measured by the at least one proximity sensor. Typically, the at least one pattern is provided on at least one selected of the group consisting of the rotor shaft and a flange of the rotor shaft. In a typical embodiment, the at least one pattern includes a ramp, in particular a continuous ramp. In an embodiment, which may be combined with other embodiments disclosed herein, the at least one pattern includes a protrusion.

In a typical embodiment, which may be combined with other embodiments disclosed herein, the output is compared with the at least one reference value at at least one predetermined angular position of the rotor shaft, in particular where the pattern is provided. Typically, loads in radial direction on the rotor shaft are determined using the output of the at least one proximity sensor.

In a typical embodiment, which may be combined with other embodiments disclosed herein, a method may include generating an alert if the difference between the at least one reference value and the detected output exceeds a predetermined value.

Typically, the at least one proximity sensor is a linear sensor that converts the measured distance linearly into the output signal. For example, the output signal is at least one selected of the group consisting of a digital signal, current values, and a voltage values.

In a typical embodiment, which may be combined with other embodiments disclosed herein, the control arrangement includes at least four proximity sensors. Typically, the at least one proximity sensor is arranged such that the control device may deduct from the output signal the load on the wind rotor shaft, wherein in particular the control device is adapted to deduct the load on the wind rotor shaft. Typically, the pattern includes at least two, in particular three, four, five, or more different distances to the proximity sensor. For example, the pattern includes at least one selected from the group consisting of: a ramp, discrete values, and continuous values. Typically, the at least one reference value includes at least one characteristic of the at least one pattern.

This written description uses examples to disclose the invention, including the best mode, and also to enable any person skilled in the art to practice the described subject-matter, including making and using any devices or systems and performing any incorporated methods. While various specific embodiments have been disclosed in the foregoing, those skilled in the art will recognize that the spirit and scope of the claims allows for equally effective modifications. Especially, mutually non-exclusive features of the embodiments described above may be combined with each other. The patentable scope is defined by the claims, and may include such modifications and other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. A method for monitoring an operation of at least one proximity sensor of a wind turbine, the wind turbine comprising a rotor shaft, the rotor shaft comprising a pattern comprising a protrusion or a ramp, the at least one proximity sensor being configured to measure a distance between the at least one proximity sensor and the rotor shaft, the method comprising:
   using the at least one proximity sensor to generate an output, the output depending on a distance between the rotor shaft and the at least one proximity sensor, which distance is measured by the at least one proximity sensor; and
   comparing the output of the at least one proximity sensor with at least one reference value of the pattern to detect a correct operation of the at least one proximity sensor, wherein the protrusion or the ramp comprises a varying height.

2. The method according to claim 1, wherein the protrusion or the ramp is provided at the rotor shaft or a flange of the rotor shaft.

3. The method according to claim 2, wherein the distance between the protrusion or the ramp and the at least one proximity sensor varies as the protrusion or the ramp passes a sensing path of the at least one proximity sensor when the rotor shaft rotates.

4. The method according to claim 2, wherein the pattern comprises a protrusion.

5. The method according to claim 1, wherein the output is compared with the at least one reference value of the pattern at least one predetermined angular position of the rotor shaft.

6. The method according to claim 1, wherein the output is compared with the at least one reference value of the pattern at least one predetermined angular position of the rotor shaft where the pattern is provided.

7. The method according to claim 1, wherein loads in radial direction on the rotor shaft are determined using the output of the at least one proximity sensor.

8. The method according to claim 1, further comprising generating an alert if the difference between the at least one reference value of the pattern and the output exceeds a predetermined value.

9. A monitoring system for a wind turbine, the wind turbine comprising a rotor shaft, the rotor shaft comprising a pattern comprising a protrusion or a ramp, the monitoring system comprising:
   at least one proximity sensor configured to measure a distance between the at least one proximity sensor and the rotor shaft and to generate an output signal corresponding to the measured distance; and
   a control device configured to receive the output signal of the at least one proximity sensor and to compare the output signal with at least one reference value of the pattern to detect a correct operation of the at least one proximity sensor,
   wherein the protrusion or the ramp comprises a varying height.

10. The monitoring system according to claim 9, wherein the at least one proximity sensor is a linear sensor that converts the measured distance linearly into the output signal.

11. The monitoring system according to claim 9, wherein the output signal is at least one of a digital signal, current values, and voltage values.

12. The monitoring system according to claim 9, wherein the monitoring system comprises at least four proximity sensors.

13. The monitoring system according to claim 9, wherein the at least one proximity sensor is arranged such that the control device determines from the output signal the load on the rotor shaft.

14. The monitoring system according to claim 9, wherein the protrusion or the ramp is provided at the rotor shaft or a flange of the rotor shaft.

15. The monitoring system according to claim 14, wherein the pattern comprises at least two different distances to the at least one proximity sensor.

16. The monitoring system according to claim 9, wherein the at least one reference value of the pattern comprises at least one characteristic of the pattern.

17. The monitoring system according to claim 9, wherein the control device is configured to generate an alert if the difference between the at least one reference value of the pattern and the output signal exceeds a predetermined value.

18. A wind turbine comprising a monitoring system and a rotor shaft, the rotor shaft comprising a pattern comprising a protrusion or a ramp, the monitoring system comprising:
- at least one proximity sensor configured to measure a distance between the at least one proximity sensor and the rotor shaft and to generate an output signal corresponding to the measured distance; and
- a control device configured to receive the output signal of the at least one proximity sensor and to compare the output signal with at least one reference value of the pattern to detect a correct operation of the at least one proximity sensor,
- wherein the protrusion or the ramp comprises a varying height.

* * * * *

UNITED STATES PATENT AND TRADEMARK OFFICE
CERTIFICATE OF CORRECTION

| | | |
|---|---|---|
| PATENT NO. | : 8,222,760 B2 | Page 1 of 1 |
| APPLICATION NO. | : 12/826031 | |
| DATED | : July 17, 2012 | |
| INVENTOR(S) | : Detlef Menke | |

It is certified that error appears in the above-identified patent and that said Letters Patent is hereby corrected as shown below:

IN THE CLAIMS:

In Column 8, Line 41, in Claim 5, delete "at least" and insert -- at at least --, therefor.

In Column 8, Line 44, in Claim 6, delete "at least" and insert -- at at least --, therefor.

Signed and Sealed this
Sixth Day of November, 2012

David J. Kappos
*Director of the United States Patent and Trademark Office*